(12) United States Patent
Vandebeuque

(10) Patent No.: US 8,966,985 B2
(45) Date of Patent: Mar. 3, 2015

(54) RESONATOR INCLUDING A PASSIVATION LAYER, A VIBRATING SENSOR INCLUDING SUCH A RESONATOR, AND A METHOD OF MANUFACTURE

(75) Inventor: Paul Vandebeuque, Paris (FR)

(73) Assignee: Sagem Defense Securite, Paris (FR)

(*) Notice: Subject to any disclaimer, the term of this patent is extended or adjusted under 35 U.S.C. 154(b) by 236 days.

(21) Appl. No.: 13/504,918

(22) PCT Filed: Nov. 10, 2010

(86) PCT No.: PCT/EP2010/006833
§ 371 (c)(1),
(2), (4) Date: Apr. 27, 2012

(87) PCT Pub. No.: WO2011/057766
PCT Pub. Date: May 19, 2011

(65) Prior Publication Data
US 2012/0216620 A1  Aug. 30, 2012

Related U.S. Application Data

(60) Provisional application No. 61/325,043, filed on Apr. 16, 2010.

(30) Foreign Application Priority Data

Nov. 12, 2009 (FR) .................................... 09 05426

(51) Int. Cl.
*G01H 11/00* (2006.01)
*G01C 19/5691* (2012.01)
*G01C 19/56* (2012.01)

(52) U.S. Cl.
CPC ............ *G01C 19/5691* (2013.01); *G01C 19/56* (2013.01)
USPC ............................................ 73/649; 310/300

(58) Field of Classification Search
USPC .................................. 73/649, 504.08; 310/300
See application file for complete search history.

(56) References Cited

U.S. PATENT DOCUMENTS

| | | | | |
|---|---|---|---|---|
| 5,438,231 A | * | 8/1995 | Khoshnevisan et al. | ....... 310/321 |
| 5,450,751 A | * | 9/1995 | Putty et al. | ................. 73/504.18 |
| 7,100,444 B2 | * | 9/2006 | Challoner | ................. 73/504.02 |
| 7,987,714 B2 | * | 8/2011 | DeNatale et al. | ........... 73/504.13 |
| 8,101,458 B2 | * | 1/2012 | Kumar et al. | .................. 438/106 |
| 8,393,212 B2 | * | 3/2013 | Ge et al. | ..................... 73/504.13 |
| 8,490,485 B2 | * | 7/2013 | Vandebeuque et al. | .... 73/504.13 |
| 8,610,333 B2 | * | 12/2013 | Pang et al. | ...................... 310/321 |
| 8,631,702 B2 | * | 1/2014 | Horning et al. | ............ 73/504.13 |
| 2003/0019296 A1 | | 1/2003 | Stewart et al. | |
| 2009/0009030 A1 | * | 1/2009 | Freidhoff et al. | ............. 310/314 |

FOREIGN PATENT DOCUMENTS

EP         1 445 580 A1    8/2004

* cited by examiner

*Primary Examiner* — J M Saint Surin
(74) *Attorney, Agent, or Firm* — Muncy, Geissler, Olds & Lowe, P.C.

(57) ABSTRACT

A resonator has a body of silicon-based material with at least one resonant part having at least one portion covered in an electrical conduction layer and at least one portion not covered in a conduction layer. The portion of the resonator not covered in a conduction layer is covered in a passivation layer in such a manner that, in the resonant part, the silicon-based material is completely covered by the conduction layer and by the passivation layer in combination. A vibrating sensor is also provided which includes such a resonator and a method of fabricating the resonator.

12 Claims, 1 Drawing Sheet

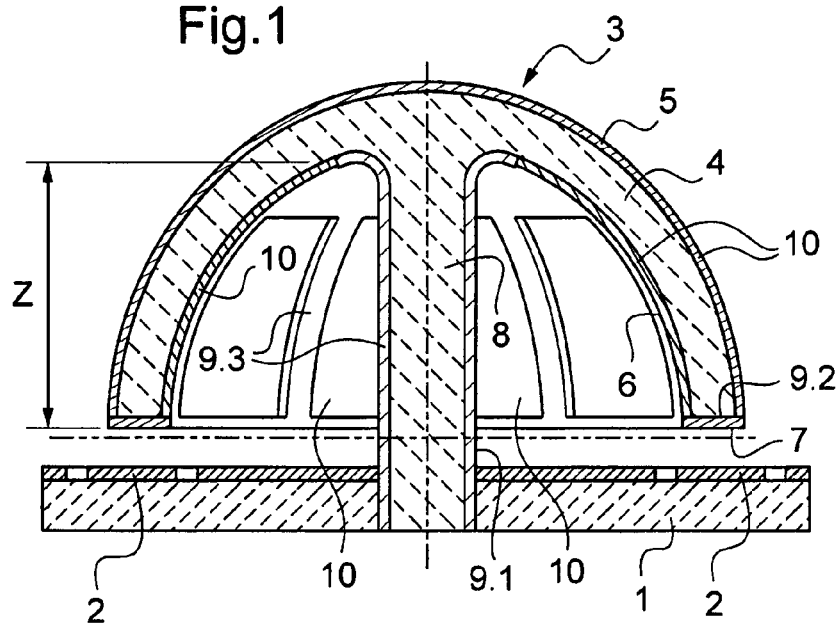
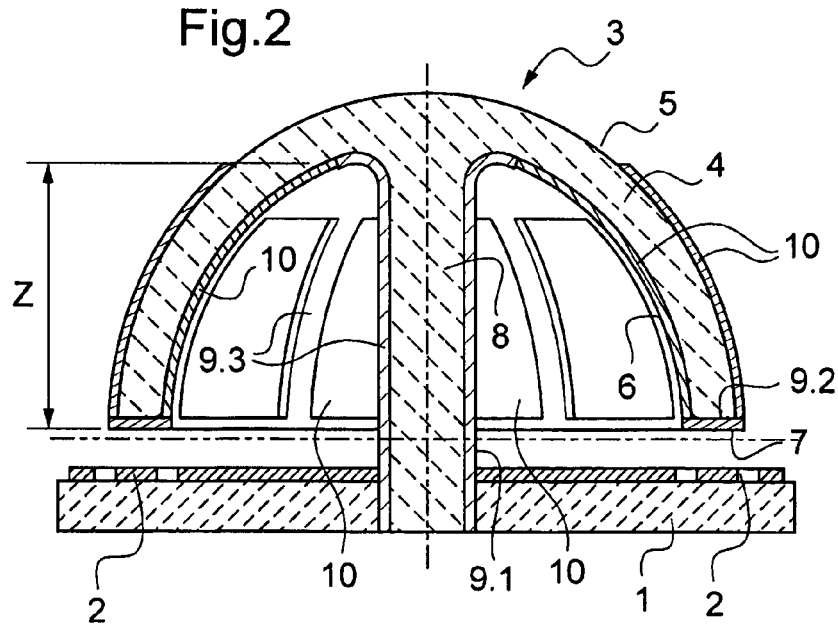

RESONATOR INCLUDING A PASSIVATION LAYER, A VIBRATING SENSOR INCLUDING SUCH A RESONATOR, AND A METHOD OF MANUFACTURE

BACKGROUND OF THE INVENTION

1. Field of the Invention

The present invention relates to a resonator, to a vibrating sensor including such a resonator, and to a method of fabricating the resonator. Such a resonator is used for example in vibrating sensors of the gyro type.

2. Brief Discussion of the Related Art

The general principle of a vibrating sensor is to subject a resonator to vibration and to detect a physical magnitude that is representative of the influence of an acceleration on the vibration.

Vibrating sensors exist that include an electrode-carrying plate with a resonator mounted thereon. The resonator comprises a body having a substantially hemispherical resonant part with a pole that is connected to the electrode-carrying plate by a sensor stem. The resonant part comprises a hemispherical web defined by an outside surface and an inside surface, which surfaces have free edges that are connected to each other by a plane annular surface that extends facing the electrodes secured to the electrode-carrying plate. The resonant part and the stem are covered in an electrical conduction layer. The electrical conduction layer and the electrodes are connected to different potentials so as to subject the web to periodic elliptical deformation and so as to detect the orientation of the ellipse, e.g. as a function of capacitances of values that depend on the gap formed between the electrodes and the plane annular surface.

The body is made of silica because of its isotropic properties and its very low mechanical damping.

In an embodiment that used to be widespread, the resonant part and the stem were completely covered in a layer of chromium forming the conduction layer (see for example document US-A-2003/0019296).

Nevertheless, it was subsequently found that the layer of chromium contributed non-negligible mechanical damping.

Resonators were thus considered in which the layer of chromium did not extend over all of the resonant part: the layer of chromium then covered the stem and the annular surface, and was provided with branches extending over the inside surface from the stem to the annular surface. That enabled damping to be reduced significantly, thereby giving rise to a large increase in the performance of vibrating sensors incorporating such resonators.

Subsequently, replacing the chromium in those resonators with platinum has enabled the performance of vibrating sensors to be further improved.

The document EP-A-1445580 discloses a resonator having an inside surface fully covered by a conductive metal coating and an outside surface left uncovered.

Nevertheless, silica is a material with a very active surface that tends to establish bonds with its surroundings. Silica becomes covered on its surface in groups of silanol Si—OH or silane Si—H that are strongly polar and that can combine with examples in the surroundings. In vibrating sensors, the resonator is in a vacuum so that such contamination of the silica does not occur. Nevertheless, the research that has led to the invention has shown that such contamination of the silica that is left uncovered by the conduction layer gives rise to unstable and anisotropic modification of the geometrical properties and of the mechanical damping of the resonator, even when the level of contamination is low: such modification is likely to lead to drift that cannot be compensated electronically because it is unstable.

SUMMARY OF THE INVENTION

According to the invention, there is provided a resonator comprising a body of silicon-based material having at least one resonant part comprising at least one portion covered in an electrical conduction layer and at least one portion not covered in a conduction layer, the portion not covered in a conduction layer being covered in a passivation layer in such a manner that, in the resonant part, the silicon-based material is completely covered by the conduction layer and by the passivation layer in combination.

Thus, the passivation layer protects the silicon-based material which is no longer exposed to contamination in its resonant part. Since the main function of the passivation layer is merely to isolate the silicon-based material from its surroundings, it may be of a thickness that is reduced to a minimum so as to degrade its mechanical characteristics very little or not at all, and in particular so as to degrade the damping of the resonant part very little or not at all.

Advantageously, the passivation layer is made of noble metal and, preferably, the noble metal is platinum.

The influence of the passivation layer on the behavior of the resonator is thus minimal.

In an advantageous embodiment of the passivation layer, the conduction layer and the passivation layer are made of the same material and the conduction layer is of thickness greater than the thickness of the passivation layer.

This makes the resonator easier to fabricate.

In an advantageous embodiment of the body of the resonator, the resonant part comprises at least one web portion of substantially hemispherical shape defined by an outside surface and an inside surface that are covered by the passivation layer, which surfaces have free edges that are connected to each other by a plane annular surface covered by the conduction layer, and preferably, the conduction layer has branches extending over the inside surface from the annular surface to a pole of the inside surface.

The resonator made in this way presents mechanical properties that impart good performance to the vibrating sensor incorporating it.

The invention also provides a vibrating sensor comprising an electrode-carrying plate and a resonator, the body including a stem connecting the resonant part to the electrode-carrying plate in such a manner that the conduction layer extends facing electrodes secured to the electrode-carrying plate, the stem being covered in an electrical conduction layer connected to the conduction layer of the annular surface by electrical connection means.

Finally, the invention provides a method of fabricating a resonator including a body of silicon-based material having at least one resonant part with at least one first portion covered in an electrical conduction layer and at least one second portion covered in a passivation layer of the same material as the conduction layer, the method including the step of depositing a thickness of material both on the first portion and the second portion that is sufficient to form the passivation layer, and then in depositing a thickness of material once more on the first portion only in such a manner that the total thickness of the material deposited on the first portion is sufficient to form the conduction layer.

This fabrication method is particularly simple.

Other characteristics and advantages of the invention appear on reading the following description of particular, non-limiting embodiments of the invention.

BRIEF DESCRIPTION OF THE DRAWINGS

Reference is made to the accompanying drawing, in which:
FIG. 1 is an axial section view of a sensor in a first embodiment; and
FIG. 2 is a view analogous to FIG. 1 of a sensor in a second embodiment.

DETAILED DESCRIPTION OF THE PREFERRED EMBODIMENTS

With reference to the figures, the vibrating sensor in accordance with the invention comprises an electrode-carrying plate 1 having electrodes 2 formed thereon, which electrodes are arranged in a circle and connected to a control unit (not shown).

The electrode-carrying plate 1 is fastened to a resonator given overall reference 3 that comprises a silica body. The body comprises a hemispherical web 4 defined by an outside surface 5 and an inside surface, which surfaces have free edges that are connected to each other by a plane annular surface 7.

A stem 8 extends diametrically from the pole of the hemispherical web 4 so as to have a free end that projects beyond the annular surface 7, for fastening to the electrode-carrying plate 1.

The zone Z of the hemispherical web 4 that extends from the plane annular surface 7 towards the pole over about 80% to 90% of the height of the web constitutes the resonant part of the body of the resonator 3 (which part is labeled Z by reference to the zone Z).

An electrical conduction layer 9 extends over the body of the resonator 3, said layer comprising a substantially cylindrical portion 9.1 covering the stem 8, a plane annular portion 9.2 covering the annular surface 7, and branches 9.3 extending over the inside surface 6 between the cylindrical portion 9.1 and the plane annular portion 9.2.

In the first embodiment shown in FIG. 1, the conduction layer 9 thus leaves uncovered all of the outside surface 5 and those portions of the inside surface 6 that extend between the branches 9.3. A passivation layer 10 extends on these uncovered surface portions: all of the outside surface 5 and the portions of the inside surface 6 that extend between the branches 9.3 are thus covered by the passivation layer 10.

The conduction layer 9 and the passivation layer 10 are made of the same electrically conductive material that is chemically inert relative to the environment that surrounds the resonator 3 when it is in use. The selected material is a noble metal, here platinum.

The conduction layer 9 is of thickness greater than the thickness of the passivation layer 10. The conduction layer 9 has a thickness greater than 15 nanometers (nm) and is preferably equal to about 50 nm, while the passivation layer 10 has a thickness lying in the range 1 nm to 10 nm, and is preferably equal to about 5 nm (the thickness ratios shown in the figures are arbitrary).

The method of fabricating the resonator includes the step of depositing over the entire surface of the resonator 3a thickness of material that is sufficient to form the passivation layer 10, and then in further depositing an extra thickness of material on the stem 8, on the plane annular surface 7, and on the inside surface 6, so that the total thickness of material deposited on the first portion is sufficient to form the cylindrical portion 9.1, the plane annular portion 9.2, and the branches 9.3 of the conduction layer 9.

By way of example, the first layer of platinum is applied by applying platinum using means that break the silicon bonds in the silica, and by subjecting the platinum to annealing at a temperature that is high enough to reduce resistivity in the platinum while maintaining electrical continuity for the conduction layer. The platinum is applied by cathode sputtering in this example. The annealing is performed at a temperature lying in the range 400° C. to 550° C., and preferably at 550° C.

In the second embodiment shown in FIG. 2, the passivation layer 10' covers the surface portions left uncovered by the conduction layer, but only in the resonant part Z. The polar zone of the outside surface 5 is thus left uncovered whether by the conduction layer 9 or by the passivation layer 10'.

Naturally, the invention is not limited to the embodiments described but covers any variant coming within the ambit of the invention as defined by the claims.

In particular, the passivation layer extends as far as the conduction layer on the stem and presents thickness that is sufficient to ensure electrical conduction between the two conduction layers.

The material of the passivation layer may be different from that mentioned and may be different from the material of the conduction layer. Any stainless material having the ability to develop bonds with silicon is suitable for use in forming the passivation layer, e.g. platinum, iridium, osmium, rhodium, or ruthenium.

The resonator can comprise a body of silicon-based material having at least one resonant part Z comprising at least one portion covered in an electrical conduction layer 9 and at least one portion not covered in a conduction layer, the resonator being characterized in that the portion not covered in a conduction layer is covered in a passivation layer 10, 10' in such a manner that, in the resonant part, the silicon-based material is completely covered by the conduction layer and by the passivation layer in combination, the passivation layer being in material different from the one of the conduction layer and having or not a thickness equal to the one of the conduction layer. The material of the passivation layer different from the material of the conduction layer can be a conductive material such as a metal.

In a variant, the electrical connection of the portion 9.1 of the conduction layer to the portion 9.2 of the conduction layer may be provided, by the passivation layer, providing it presents thickness relative to its area that is sufficient to ensure sufficient transfer of electric charge (since the area of the passivation layer is relatively large, its thickness may be relatively small).

Although the invention is described with reference to a substrate made of $SiO_2$, it also applies to other silicon compounds, in particular SiN; SiC; crystalline, polycrystalline, or porous Si; cast quartz; . . . .

The resonator may be of a shape other than that described, for example it could be in the form of a beam.

The invention claimed is:
1. A resonator comprising a body of silicon-based material having at least one resonant part comprising at least one portion covered in an electrical conduction layer and at least one portion not covered in a conduction layer, wherein the portion not covered in a conduction layer is covered in a passivation layer in such a manner that, in the resonant part, the silicon-based material is completely covered by the conduction layer and by the passivation layer in combination.

2. The resonator according to claim 1, wherein the passivation layer is made of noble metal.

3. The resonator according to claim 2, wherein the noble metal is platinum.

4. The resonator according to claim 1, wherein the conduction layer and the passivation layer are made of the same material, and wherein the conduction layer is of thickness greater than the thickness of the passivation layer.

5. The resonator according to claim 1, wherein the resonant part comprises at least one web portion of substantially hemispherical shape defined by an outside surface and an inside surface that are covered by the passivation layer, which surfaces have free edges that are connected to each other by a plane annular surface covered by the conduction layer.

6. The resonator according to claim 5, wherein the conduction layer has branches extending over the inside surface from the annular surface to a pole of the inside surface.

7. A vibrating sensor comprising an electrode-carrying plate and a resonator according to claim 6, the body including a stem connecting the resonant part to the electrode-carrying plate in such a manner that the conduction layer extends facing electrodes secured to the electrode-carrying plate, the stem being covered in an electrical conduction layer connected to the conduction layer of the annular surface by electrical connection means.

8. A resonator comprising a body of silicon-based material having at least one resonant part comprising at least one portion covered in an electrical conduction layer and at least one portion not covered in a conduction layer, wherein the portion not covered in a conduction layer is covered in a passivation layer in such a manner that, in the resonant part, the silicon-based material is completely covered by the conduction layer and by the passivation layer in combination, wherein the conduction layer has a thickness greater than 15 nm, and wherein the passivation layer has a thickness lying in the range 1 nm to 10 nm.

9. The resonator according to claim 8, wherein the conduction layer and the passivation layer are made of the same material.

10. The resonator according to claim 8, wherein the conduction layer has a thickness preferably equal to about 50 nm.

11. The resonator according to claim 8, wherein the passivation layer has a thickness preferably equal to about 5 nm.

12. A method of fabricating a resonator including a body of silicon-based material having at least one resonant part with at least one first portion covered in an electrical conduction layer and at least one second portion covered in a passivation layer of the same material as the conduction layer, the method including the step of depositing a thickness of material on both the first portion and the second portion that is sufficient to form the passivation layer, and then in depositing a thickness of material once more on the first portion only in such a manner that the total thickness of the material deposited on the first portion is sufficient to form the conduction layer.

* * * * *